United States Patent [19]
Doby et al.

[11] 3,921,207
[45] Nov. 18, 1975

[54] OUTAGE INDICATING APPARATUS FOR METER TELEMETRY SYSTEMS INCLUDING DATA RECORDERS

[75] Inventors: William P. Doby; Albert H. Maxwell, Jr., both of Raleigh, N.C.

[73] Assignee: Westinghouse Electric Corporation, Pittsburgh, Pa.

[22] Filed: Sept. 26, 1974

[21] Appl. No.: 509,612

[52] U.S. Cl. ................ 360/6; 324/113; 346/14 MR
[51] Int. Cl.² .................... G01D 9/04; G01R 13/04
[58] Field of Search ........ 360/6, 5; 346/14 MR, 20; 324/110, 113, 114, 142; 235/151.31

[56] References Cited
UNITED STATES PATENTS

| | | |
|---|---|---|
| 3,148,329 | 9/1964 | Lenehan .................. 346/14 MR |
| 3,401,395 | 9/1968 | Neher .................................. 324/113 |
| 3,500,431 | 3/1970 | Baskin .................................. 360/6 |
| 3,531,771 | 9/1970 | Jaxheimer .................. 346/14 MR |
| 3,678,484 | 7/1972 | Maxwell, Jr. ................... 360/6 |
| 3,716,679 | 2/1973 | Graesslin ........................... 360/6 |
| 3,801,963 | 4/1974 | Chen .................................... 360/5 |

*Primary Examiner*—Terrell W. Fears
*Assistant Examiner*—Jay P. Lucas
*Attorney, Agent, or Firm*—R. W. Smith

[57] ABSTRACT

An outage condition in a quantity measured by a meter is detected in a data recorder that is connected in a telemetry system to record the meter data information. Data pulses and time interval pulses are recorded in separate data and time tracks of a recording medium. An outage indicating pulse is recorded in the time track preferably in a predetermined relationship to an interval pulse. The outage pulse is detected in a translator upon translation of the recorded data and interval pulses so as to indicate the time of the outage condition.

8 Claims, 4 Drawing Figures

OUTAGE INDICATING APPARATUS FOR METER TELEMETRY SYSTEMS INCLUDING DATA RECORDERS

CROSS REFERENCE TO RELATED APPLICATIONS

This invention is related to U.S. Pat. applications Ser. No. 509,613 by C. J. Snyder et al, and Ser. No. 509,614 by W. P. Doby both filed concurrently with this application and are assigned to the assignee of this invention.

BACKGROUND OF THE INVENTION

This invention relates to metering telemetry systems including a recorder for recording an outage condition as well as meter data and time interval information and more particularly to such systems in which an outage in the measured quantity is recorded as a pulse having a predetermined position in a time recording track to indicate the time of the outage condition during data translation.

The recording of utility meter readings for extended periods in the order of a month for later translation and calculation of power demand, billing and load survey information of electric utility customers is well known. In U.S. Pat. No. 3,059,239 issued to C. J. Snyder on Oct. 16, 1962; U.S. Pat. No. 3,148,329 issued to B. E. Lenehan on Sept. 8, 1964; U.S. Pat. No. 3,189,821 issued to A. J. Petzinger on June 15, 1965; and U.S. Pat. No. 3,470,470 issued to C. J. Snyder on Sept. 30, 1969, all assigned to the assignee of this invention, magnetic recording devices are described and claimed for recording watthour meter or other meter data pulses and time interval pulses. These recorders are operated continuously for extended periods corresponding to monthly billing periods or monthly periods for accumulating meter pulse data for measured quantities such as wind direction as disclosed in U.S. Pat. No. 3,665,759 issued to T. J. Daley on May 30, 1972 and assigned to the assignee of this invention. In U.S. Pat. No. 3,602,458 issued to W. P. Doby et al on Aug. 31, 1971 and assigned to the assignee of this invention, tape cartridge capable of operating for extended recording periods is described and claimed. As noted in these patents, when the beginning and end times of the recording period is known an exact time record of the occurrence of the meter data information is known by correlating real time to the recorded time pulses. Power consumption, maximum demand billing, and peak load information are conveniently calculated from the record tapes, for example, when the recorded data pulses represent kilowatts of power usage by a customer's electric load.

Translation of the recorded data is preferably provided in a translator as described and claimed in U.S. Pat. No. 3,678,484 issued to A. H. Maxwell, Jr. on July 18, 1972 and in U.S. Pat. No. 3,740,724 issued to C. J. Snyder on May 14, 1971 both assigned to the assignee of this invention. The recorded tape in a tape cartridge, as disclosed in the Doby et al U.S. Pat. No. 3,602,458 is rewound and the data is read into the translator in a reverse direction relative to the recorded direction. The translator includes a counting operation to totalize the data pulses recorded on one or more data recording tracks between the time interval pulses. The totalized pulse information along with identifying and other programmed information associated with the data pulses is provided at the output of the translator as described in the Maxwell, Jr. U.S. Pat. No. 3,678,484. The translator output may be provided on computer tape or punched cards for subsequent processing in a commercial computer or provided directly to the input of the commercial computer or also provide a direct teleprinter print-out of billing or other desired power usage data.

One problem that has been noted in some instances is the occurrence of power outages during the metering of the electric power consumption in the aforementioned recorder telemetry systems. When the power outage occurs, the recorder stops and then starts again at the end of the outage. The recorded data and interval pulses appear the same whether there is an interruption in the recording or not. In the U.S. Pat. No. 3,538,406 issued to C. J. Snyder on Nov. 3, 1970, and assigned to the assignee of this invention, a battery powered data recorder is disclosed and claimed. Also, a battery carryover feature may be included in the recorders to operate the recorder from a battery only during power outages. This continues and maintains the tape movement so that all time pulses are recorded over an extended period even when several outages occur. Since no power is being measured the data recording tracks will be blank. The interval between time pulses can be preselected and in one typical embodiment is 15 minutes. This permits the proper time reference to be maintained during translation of the record tapes recorded when power outage conditions occurred in the power system being monitored.

Without the battery carryover recorder feature the system user typically has a separate record of the time of the outage. When this is known, the times assigned to the data following the outage can be adjusted to approximately compensate for the outage. The accuracy of this compensation is limited to the time between interval pulses on the tape. For example, with a 15 minute interval data recorder, interval pulses following the outage are adjusted in 15 minute increments. Therefore, unless the outage was an even multiple of 15 minutes, the adjusted reading may lag real time by as much as 15 minutes. For many cases this time discrepancy is not important and the data may still be used. In cases where this time difference prohibits use of the data, it is still convenient to know when the power outage occured so that the data to that point may be accepted and the data following it may be discarded. This procedure becomes difficult to implement and loses its accuracy when two or more outages occur in 1 month.

Accordingly, it is desirable to have an indication of a power outage condition recorded on the recording tape. The length of the outage will be known so that the translating computing apparatus may be adjusted to compensate for the outage condition and maintain the translated data in the proper relationship.

SUMMARY OF THE INVENTION

In accordance with the present invention outage indicating apparatus is including in a metering telemetry system including a data recorder that records data pulses and time interval pulses and further records outage pulses. Outage indicating apparatus in the data translator indicates the time of outage conditions in response to reading a recorded outage pulse. This permits adjusting the translated data to maintain the proper time orientation of the translated data following a power outage condition. In the data recorder, an outage indicating circuit is connected to a time interval record circuit. In one embodiment a current signal is generated through a time recording head at the time an outage occurs.

In a second and preferred embodiment, an outage condition is recorded as an outage pulse at a predetermined position relative to a time interval pulse. An outage impulse control element is connected in the outage indicating circuit and a time impulse control element is connected in a time recording circuit. The outage impulse control element is actuated at regular intervals at the same rate as is the time impulse control element. The time impulse control element is effective to generate a current signal through a time interval recording head circuit and produce a recorded time interval pulse in the recording medium. The recorder outage indicating circuit is connected to be responsive to the presence of the quantity being measured such that an outage detecting device formed by a switching control member is rendered to a first conducting condition when the measured quantity is present and is rendered to a second conducting condition when there is an interruption or an outage in the presence of the measured quantity. When the switching control member is operated between the first and second conducting conditions in response to an outage condition, the outage impulse control element is effective upon return of the measured quantity to apply a current signal to the time recording head and record an outage pulse in same time recording track including the time interval pulses. While the measured quantity is continuously present, the first conducting condition of the switching control member renders the outage indicating circuit inactive to prevent a recorded outage pulse in response to actuation of the outage impulse control element. The time impulse and outage impulse control elements are actuated at different predetermined time so as to record an outage pulse at a predetermined position from an interval pulse on the recording medium. The predetermined spacing is in the order of within one-tenth of the interval spacing between time interval pulses.

A translator operated in accordance with this invention includes apparatus including an outage indicating circuit responsive to sensing an interval pulse and an outage pulse within a predetermined time slot including the predetermined spacing between the recorded interval and outage pulses. The translator outage indicating circuit produces an outage indicating signal to indicate that an outage condition occurred relative to a recorded interval pulse during translating processing of the meter data information.

It is an important feature of this invention to provide a utility metering telemetry system for monitoring electric power consumption of a customer's electric load and having a data magnetic recorder for recording watt demand indicating data pulses in one recording track and time interval pulses in a time track with outages in the measured electric power being recorded in the time track at a predetermined position relative to an interval pulse. A further feature of this invention is to record an outage pulse in the time track of a data recorder subsequent to an outage condition and at a predetermined recorded position after a recorded interval pulse with the interval and outage pulses being magnetically recorded in a return-to-bias (RB) mode while data pulses are magnetic recorded in a nonreturn-to-zero (NRZ) mode. Another feature of this invention is to provide a data translating system for selectively processing both time interval pulses and an outage pulse recorded in the same track of a recording medium. Other advantages and features will be apparent from the detail description of the drawings hereinbelow.

DESCRIPTION OF THE PREFERRED EMBODIMENTS

Figure 1:
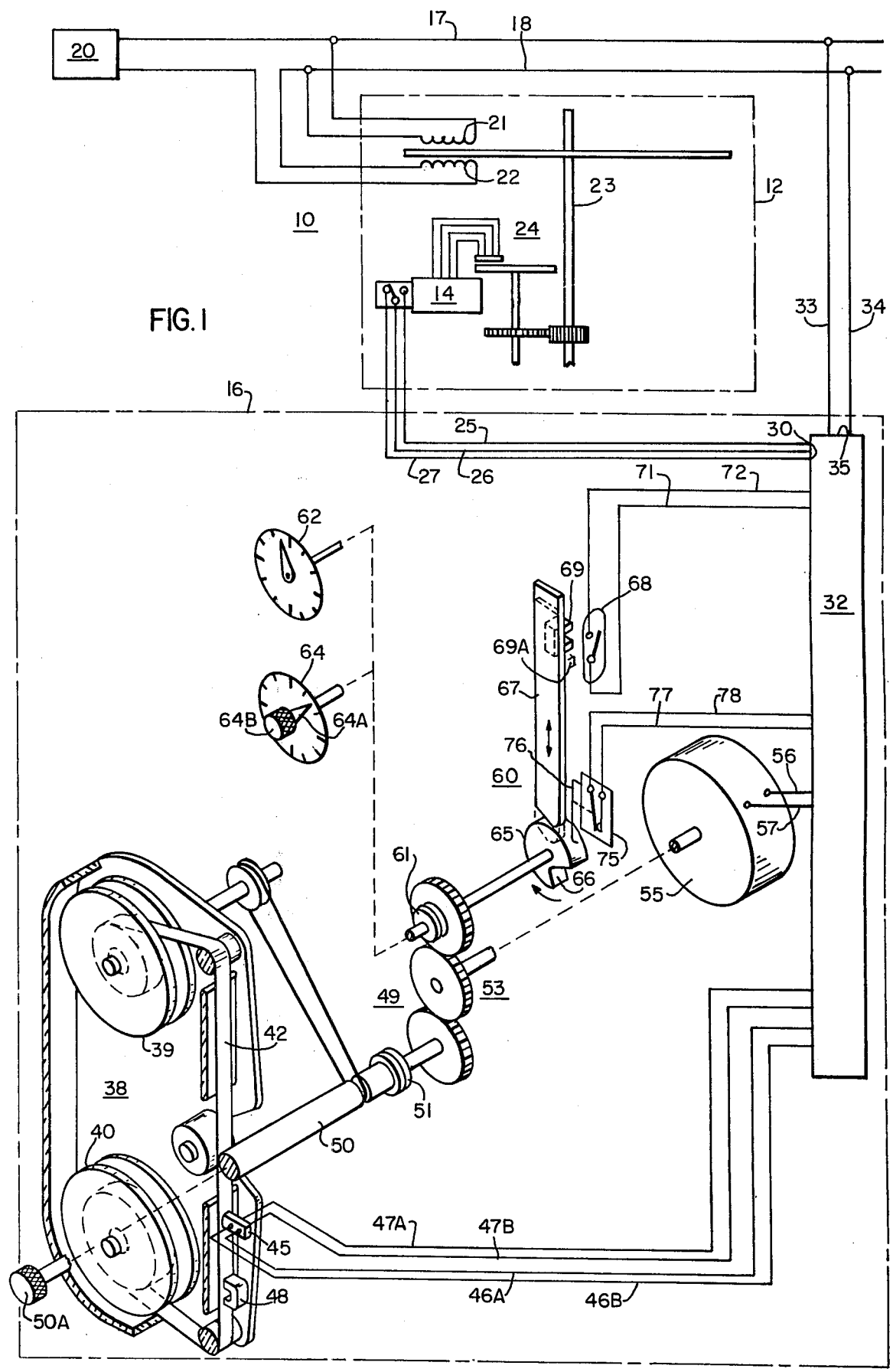
FIG. 1 is a schematic view of a utility metering telemetry system including a data recorder having parts shown in perspective and including outage indicating apparatus made in accordance with this invention.

Referring now to the drawings wherein throughout the several figures the same numeral designates the same or like elements and more particularly to FIG. 1 wherein there is shown a telemetry system 10 including an electric utility meter 12 provided by an integrating induction type watthour meter, a pulse generator 14 associated with the meter 12, and a data recorder 16 made in accordance with the present invention. The quantity of electric power supplied from a utility company through conductors 17 and 18 to a customer's electric load 20 is measured by the meter 12. The voltage winding 21 and current winding 22 of the meter 12 are connected to the conductors 17 and 18 in a well-known manner. The meter disc shaft 23 is driven at a rate proportional to the rate of consumption of electrical energy by the load 20. The pulse generator 14, includes a radiometric pulse initiator as disclosed and claimed in U.S. Pat. No. 3,722,493 issued to T. M. McClelland, III on May 15, 1973 and commercially available as a Type CD–22 photoelectric pulse initiator described in descriptive bulletin I.L. 42–570 dated Dec., 1971 and available from Westinghouse Electric Corporation, Meter Division, Raleigh, N.C. Other known three-wire contact devices which are operative to alternately effect contact closures between a common terminal and two oppositely poled terminals connected to the ends of three conductors 25, 26 and 27 at the pulse generator 14. The other ends of the conductors 25, 26 and 27, forming a so-called three-wire telemetry circuit, are connected to a data input 30 of the recorder 16.

The data recorder 16 is a modified form of the demand magnetic tape recorder described in descriptive bulletin I.L. 42–565WR–2 dated April, 1972 and available from Westinghouse Electric Corporation, Meter Division, Raleigh, N.C. The recorder includes the general features of the recorders described in the aforementioned descriptive bulletin except for the inclusion of the outage indicating apparatus of this invention. For a better understanding of this invention, the general features of the recorder are described hereinafter.

The three-wire telemetry conductors 25, 26 and 27 are connected to the data input 30 of the recorder circuits 32 illustrated as a circuit block in FIG. 1 and described in detail in connection with the description of FIG. 2 hereinbelow. The recorder circuits 32 are supplied electric power from the conductors 17 and 18 supplying the 60 Hz electric power quantity to the load 20 which quantity is measured by the meter 12. The conductors 33 and 34 are connected between the recorder power input 35 and the conductors 17 and 18.

A tape cartridge 38 as described in the aforementioned Doby U.S. Pat. No. 3,602,458 includes a take-up reel 39 and supply reel 40 carrying a recording medium formed by a magnetic tape 42. The tape a length of slightly over 500 feet is capable of recording for an extended period of approximately 36 days with time interval pulses recorded at 15 minute intervals as described hereinbelow. To provide the 1 month recording period, the capstan 50 is driven at 1/15 revolution per minute to produce a tape speed of 7 inches per hour. The cartridge 38 is removable from the recorder 16 to be transported to a central data translating center having a translator system also described hereinbelow.

Data and time recording head sections are included in a data magnetic record circuit and a time interval magnetic record circuit, respectively, of a single plural track recording head 45. Wire conductors 46A and 46B conduct data pulse current signals and wire conductors 47A and 47B conduct time interval pulse current signals produced in the circuits 32 to the magnetic record circuits of the head 45. A permanent magnet 48 is positioned adjacent the tape 42 to magnetically saturate the tape in one direction or polarity of magnetization. The tape is magnetized before passing the record heads.

A tape drive mechanism 49 drives a capstan 50 through a one-way clutch 51. A knob 50A on the capstan 50 advances the tape 42 for initial tape positioning. The mechanism 49 is driven by a gearing arrangement 53 driven from a synchronous timing motor 55. The motor 55 is energized from the recorder circuits 32 through conductors 56 and 57. A recorder timing mechanism 60 is driven from a second one-way clutch 61 and includes a clock 62, an interval indicator 64 with a pointer 64A fixed to an interval knob 64B. The timing mechanism 60 initiates time interval signals and outage signals in the recorder circuits 32 as described hereinbelow. A circular interval cam 65 is driven commonly with the clock 62 and the interval indicator 64. A cam slot 66 in the edge of cam 65 releases a cam follow 67 engaging the periphery of the cam 65 from an upper position shown in solid lines to a lower position shown in broken lines.

A time interval impulse control element includes a magnetically responsive, normally open, reed switch 68 and a permanent magnet 69 carried by the cam follower 67. The magnet 69 is positioned so that the reed switch 68 is in a non-conducting operative state when the magnet 69 is in the upper position and it is in a conducting operative state when the magnet 69 is in the lower position as indicated by the broken lines 69A. The contacts of the reed switch 68 are connected to the recorder circuits 32 by the conductors 71 and 72.

In accordance with the present invention, an outage impulse control element is formed by a microswitch 75 including an actuator 76 engaging the periphery of the cam 65. The conductors 77 and 78 connect the contacts of the switch 75 to the recorder circuit block 32. The actuator 76 is positioned so that the clockwise rotation of the cam 65 causes the cam slot 66 to first operate the cam follower 67 to the lower position and, subsequently, operate the actuator 76 to a lower position and operate the switch 75 from a closed or conductive state to an open or non-conductive state.

Figure 2:
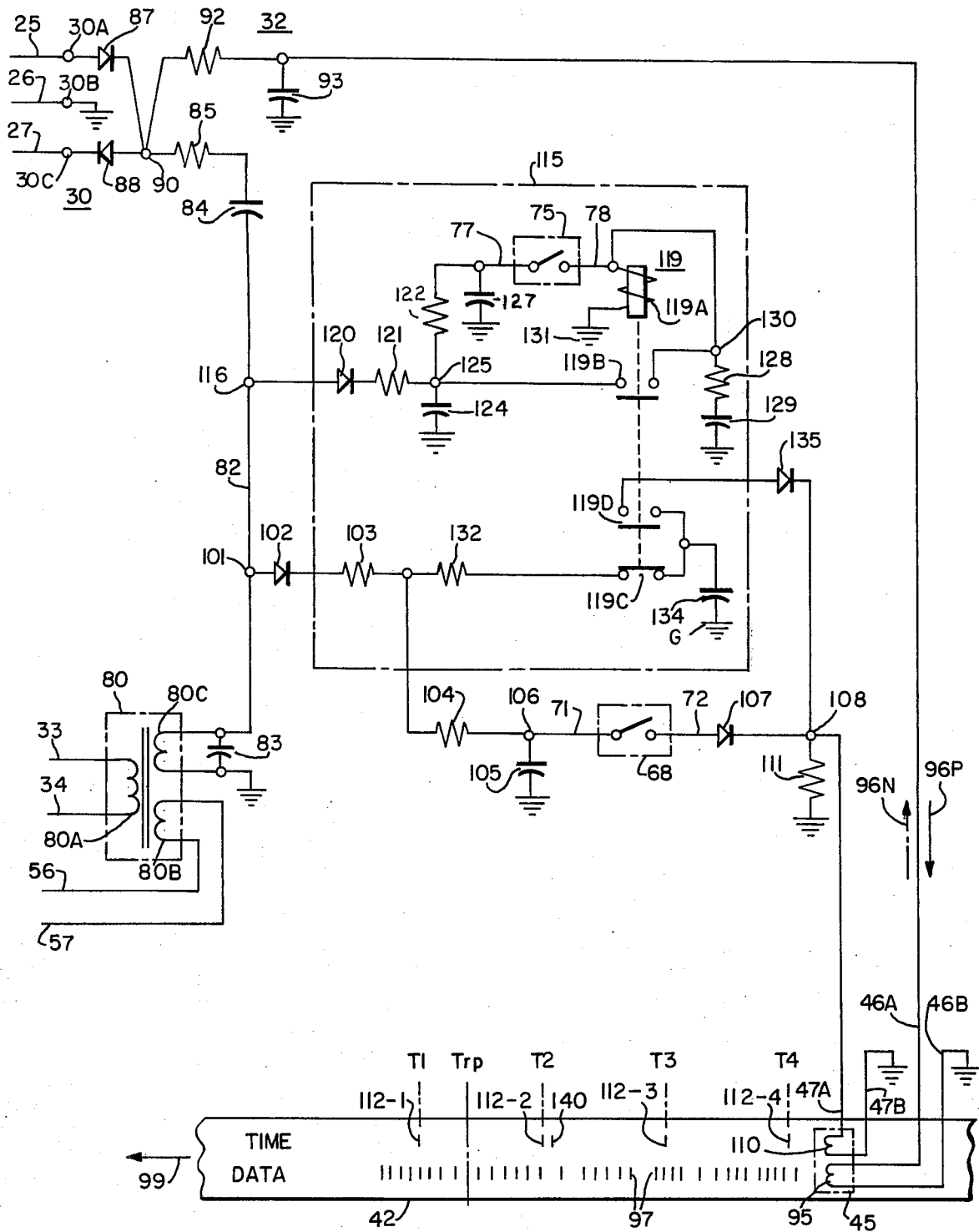
FIG. 2 is an electrical circuit diagram of one preferred form of the recording circuits included in the data recorder illustrated in FIG. 1.

Having described the principal parts of the recorder 16 reference is now made to FIG. 2 illustrating a detail electrical diagram of the recorder circuits 32. A recorder power supply 80 is formed by a transformer having a primary winding 80A connected to the conductors 33 and 34. Typically, 120 or 240 volts occurring across the conductors 17 and 18 is applied across the primary winding 80A. Two secondary windings 80B and 80C are provided such that the winding 80B is connected to the conductors 56 and 57 to supply an appropriate voltage to the timing motor 55. The 60 Hz output of the power supply 80 controls the speed of the timing motor 55 to correspond to the frequency of the electric power in the load conductors 17 and 18 since it is a synchronous type motor.

The secondary winding 80C provides an alternating current electric source at a predetermined voltage for the recorder data, time interval, and the outage recording circuits. A supply conductor 82 is connected to one terminal of the winding 80C and the other terminal thereof is connected to the circuit ground. A filter capacitor 83 is connected across the secondary winding 80C. The conductor 82 is connected through a capacitor 84 and resistor 85 to the data recording circuit.

The terminals 30A, 30B and 30C at the data input 30 are connected to the conductors 25, 26 and 27, respectively, from the three-wire contact device of the meter pulse generator 14. One of oppositely poled ends of diodes 87 and 88 in the data recording circuit are connected in series with the terminals 30A and 30C respectively. The terminal 30B is connected to the common circuit ground. The remaining ends of the diodes 87 and 88 are connected together and to the junction 90 for connection to the supply conductor 82. The junction 90 is connected through a filtering circuit including resistor 92 and capacitor 93 to the conductor 46A and a coil 95 of the data magnetic record circuit of the head 45A. The conductor 46B connects the other end of the coil 95 to the circuit ground to complete the data magnetic record circuit.

The diodes 87 and 88 rectify the supply current of conductor 82 so that with each predetermined quantum of kilowatts measured by the meter 12, the position of the three-wire contact device is changed and latched in position to initiate a new data impulse in the recorder. Accordingly, as the pulse generator 14 effects a latched contact connection between terminals 30A and 30B, current in the direction of directional arrow 96P flows through the data head coil 95. This is because diode 87 grounds the negative half wave of the winding 80C current output and causes the positive half wave current at the junction 90 to flow into the coil 95. When the terminals 30B and 30C are connected together by the next data output impulse of the pulse generator 14, the diode 88 grounds the positive half wave current appearing at the junction 90. Thus, negative half wave current is supplied through the data record coil 95 as indicated by the directional arrow 96N. Accordingly, data pulses 97 are recorded in a nonreturn-to-zero (NRZ) fashion in the data track of the magnetic tape 42 when it is fed in the direction of directional arrow 99 in the recorder 16 as illustrated at the bottom of FIG. 2. Thus, each of the pulses 97 represents a transition between opposite polarity magnetized portions in the data track of the magnetic tape 42. As noted hereinabove, the tape is premagnetized in one polarity of magnetization by the magnet 48 as shown in FIG. 1.

Referring now to the time interval recording circuit portion of the recorder circuits 32, the junction 101 of the supply conductor 82 is connected in series with the diode 102, voltage dropping resistor 103, a resistor 104 and the read switch 68, which is connected between the conductors 71 and 72. A storage capacitor 105 is connected at the junction 106 at one contact of the switch 68 and the circuit ground. The other contact of the switch 68 is connected in series with the diode 107 and a circuit junction 108. The conductors 47A and 47B connect a time interval magnetic record coil 110 of the record head 45B in series with the junction 108 and the circuit ground. A resistor 111 is connected between the junction 108 and the circuit ground.

During rotation of the interval cam 65 shown in FIG. 1 in a clockwise direction, the contacts of the reed switch 68 are periodically closed to control the timing of the time interval pulses 112-1, 112-2, 112-3, 112-4 produced in the time track of the magnetic tape 42 as shown in FIG. 2. While the reed switch is in an open state the capacitor 105 is charged from the half wave rectified current applied from the junction 101 and through the diode 102. The capacitor 105 is discharged through the interval recording head coil 110 when the reed switch contacts are closed and then reopened. This produces very short time return-to-bias (RB) recorded interval pulses 112-1, 112-2, 112-3 and 112-4 at the real times T1, T2, T3 and T4, respectively, in the time track. These times are recorded at regular 15 minute intervals in the absence of any outages in the exemplary preferred embodiment disclosed herein, however, other time intervals may be provided. The recorded time intervals correspond to watt demand metering intervals which are understood by those skilled in the art of utility power demand metering.

A power outage indicating recording circuit portion, included within the broken-line circuit block designated by the numeral 115, is connected between the junction 116 of the supply conductor 82, junction 117 between the resistors 103 and 104, and the junction 108 in the time interval recording circuit portion. A switching control member formed by a relay device 119 defines an outage detecting device that is included in the outage indicating circuit 115. A relay coil 119A controls the relay switch contacts 119B, 119C and 119D having the nonconducting and conducting states shown in FIG. 2 when the coil 119A is unenergized. One branch of the circuit 115 includes a diode 120 connected in series with junction 116, a resistor 121, a resistor 122 and the conductors 77 and 78 and, therefore, in series with the contacts of the microswitch 75. A capacitor 124 is connected to a junction 125 between resistors 121 and 122 and the common circuit ground. A capacitor 127 is connected at one end between the resistor 122 and the switch 75 and at the other end thereof to the circuit ground. A resistor 128 and capacitor 129 are connected in series and between a junction 130 located between the switch 75 and the relay coil 119A and the circuit ground. The coil 119A is connected in series between the junction 130 and the common circuit ground. The normally open relay contacts 119B are connected across the circuit junctions 125 and 130.

A second branch of the outage indicating circuit 115 is connected between the circuit junctions 117 and 108. A resistor 132, normally closed relay contacts 119C, and normally open contacts 119D are connected in series between the junctions 117 and 108. A storage capacitor 134 is connected between a common terminal of the contacts 119C and 119D and the circuit ground. A diode 135 is connected between the contacts 135 and the junction 108 in the direction of polarity shown. The diodes 107 and 135 isolate the discharges of the capacitors 105 and 134.

In operation of the outage indicating circuit 115, a power outage condition is assumed to have occurred for purposes of this description in the conductors 17 and 18 in FIG. 1 during a real time interval following the time T1 when the interval pulse 112-1 was recorded on the magnetic tape 42 shown in FIG. 2. This stops the movement of the tape 42. The initial real time at the beginning of the power outage is not indicated and the time Trp represents the real time of return to power or the end of the power outage. The recorder effectively only records in response to resumption of the measured electric power quantity following an outage. It is assumed for purposes of this description that an outage of five minutes duration occurs. A recorded power outage pulse 140 is provided in the time track at a predetermined time of approximately 10 percent of the time interval after the first interval pulse 112-2 (at the time T2) recorded after the return to power at time Trp.

Upon initial installation of the recorder 16 equipped with the outage indicating circuit 115, the interval knob 64B must be turned through an interval (normally occurring anyway when initially setting the clock 62) after the recorder circuit power supply 80 is energized. The foregoing initial procedure avoids a false indication of a power outage and initially energizes the relay coil 119A. The relay coil 119A is operated to reverse the conductive conditions of contacts 119B, 119C and 119D. The relay contact 119B is closed to act as a holding or sealing contact such that the relay coil 119A is maintained energized while the microswitch contacts open and close during each interval. Thus, the contacts 119C and 119D are placed in the open and closed states, respectively. The contacts of the microswitch 75 are closed for 90 percent of an interval and are open at the point of 10 percent after the start of an interval and then reclose during each rotation of the interval cam 65. Current from the secondary winding 80C is rectified by the diode 120 and limited by the resistor 121 to charge the capacitor 124. The voltage across the capacitor 124 is applied across the coil 119A through the closed holding contacts 119B. The opening and closing of the microswitch 75 does not change the energized condition of the coil 119A.

Upon loss or outage of power, the relay coil 119A will initially remain energized due to the discharge of capacitor 129 through resistor 128 and the coil 119A. This discharge is assisted by the energy stored in the capacitors 124 and 127 until the drop out point of the coil 119A is reached. This provides a guarded or hold-in delay time in the order of 4 to 8 seconds to avoid recording an outage condition due to momentary interruptions in the power. When the coil 119A is deenergized, the contacts 119B and 119D open and the contacts 119C close, these conditions being shown in FIG. 2.

When AC power resumes, at the time Trp, the tape 42 starts again after being stopped. The coil 119A does not energize because the contacts 119B are open and even if the contacts of the microswitch 75 are closed the value of resistor 122 is sufficiently large to prevent coil energization. Current from junction 101 and through the diode 102, resistors 103 and 132, and closed contacts 119C charges the capacitor 134. When the end of the interval is reached, the cam follower 67 enters the cam slot 66 to close the contacts of the reed switch 68. The capacitor 105 is discharged through the junction 108 and the time recording head coil 110 to record the time pulse 112-2. The time T2 is actually 15 minutes plus the 5 minute outage from time T1. The microswitch 75 is then operated by the actuator entering the cam slot 66 approximate 10 percent of the interval after time T2 so that the microswitch contacts open and then close as the actuator is cammed into and out of the slot 66. The capacitor 124 will be recharged after the return to power time Trp but capacitor 127 will not charge until the first opening of the microswitch 75 at which time it charges to the voltage of the capacitor 124. The large value of the resistor 122 prevents reenergization of the coil 119A even while the microswitch 75 is closed after the return to power. Upon the microswitch reclosing, the charge of the capacitor 127 causes the relay coil 119A to energize closing the holding contacts 119B and the opening of the contacts 119C and closing the contacts 119D. This discharges the capacitor 134 through contacts 119D and the junction 108 and into the time recording head coil 110 to record the outage pulse 140 at approximately 10 percent of the interval after the time interval pulse 112-2.

It is noted that the interval pulse 112-2 occurring at the real time T2 will be spaced at the normal interval distance from the previous interval pulse 112-1 which occurred at time T1 prior to the outage condition. The distance between the interval pulses 112-1 and 112-2 occurring at times T1 and T2 indicate a 15 minute interval in the example described herein, however, the real time that elapsed between these times is 15 minutes plus the duration of the outage, i.e. 5 minutes. The time of occurrence will be known by the utility company. Also, the duration of a single outage can be computed by noting the difference between the time indicated by the recorder clock 22 and real time. For example, the tape recorded interval pulse 112-1 at time T1 can represent a real time of 8:00 and the interval pulse occurring at T2 and T3 and T4 would in the absence of an outage, represent the times 8:15, 8:30 and 8:45 except that the outage condition changed these to actually indicate 8:20, 8:25 and 8:50. Therefore, all of the interval pulses after time T1 will have to be assigned new time values in accordance with the duration of the outage condition so as to represent the corresponding real times.

Figure 3:
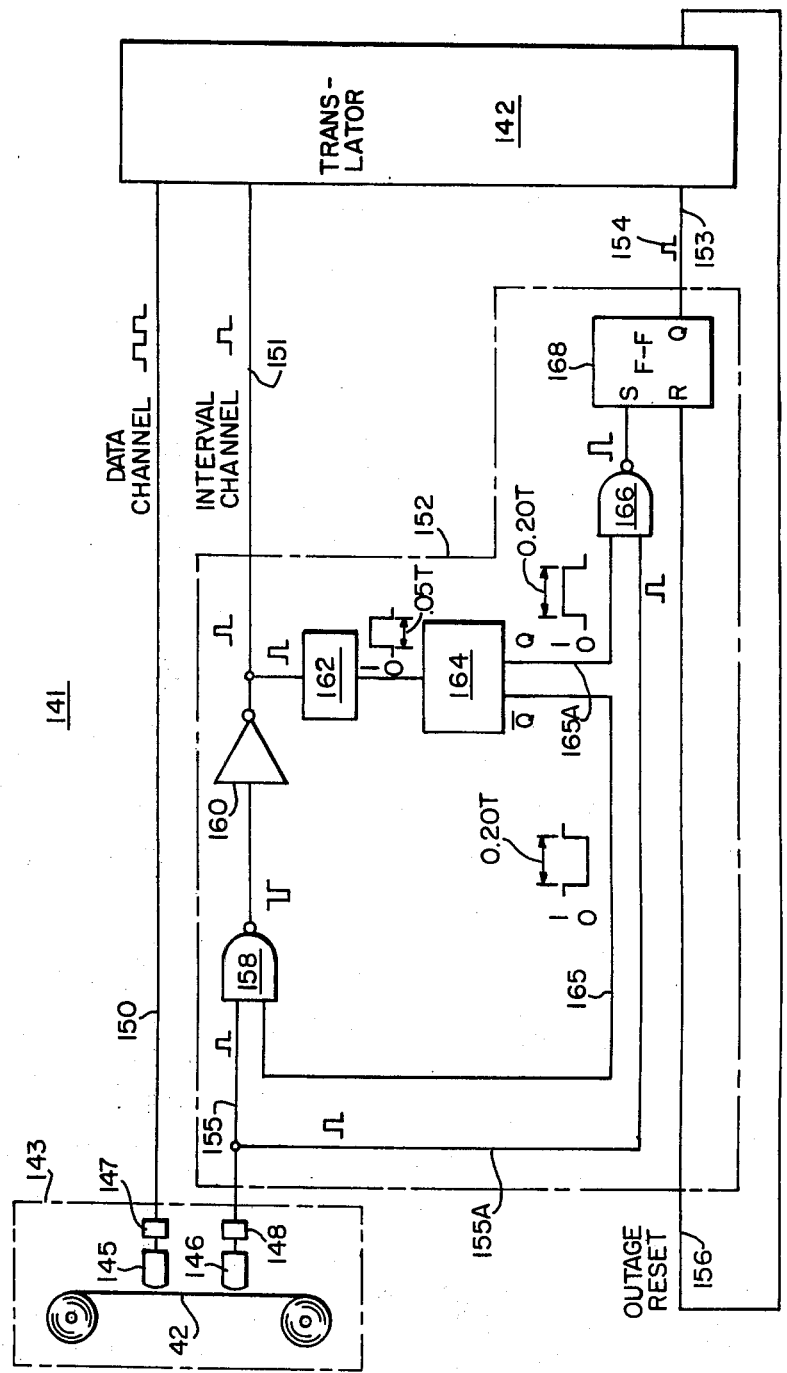
FIG. 3 is a schematic view of a data translator arrangement including apparatus made in accordance with this invention for processing the recorded outage indications provided on the recorder recording medium.

In FIG. 3 there is illustrated an electric schematic diagram of a translator system 141 for processing the recorded outage indication formed by the outage pulse 140 described hereinabove in connection with FIG. 2. The translator system 141 includes a playback deck 143 and a translator arrangement 142 operated, for example, substantially in accordance with descriptions in the Snyder U.S. Pat. No. 3,740,724 and Maxwell, Jr. U.S. Pat. No. 3,678,484 noted hereinabove. The cartridge 38 having the magnetic tape 42 recorded as shown in FIG. 2, is mounted to a playback deck 143 of the translator system 141 for readout of the recorded data pulses, interval pulses and outage pulse. The tape 42 is driven at a very high speed relative to the recording tape speed and in the order of 30 inches per second. Accordingly, the pulses of the tape 42 are sensed in the reverse order that they were recorded. The data pulses and time interval pulses are processed, for example, as described in the last-named Snyder and Maxwell, Jr. patents. Accordingly, a data magnetic pickup head 145 and interval magnetic pickup head 146 sense the pulses in the recorded data and time tracks and the associated pulse shapers 147 and 148 develop pulses in the data input channel 150 and interval input channel 151 for application to the anticoincident and counter circuits in the translator arrangement 142.

An outage indicating circuit 152 is provided in accordance with this invention and is connected to the interval input channel 151 and also includes an outage indicating signal output line 153 providing data bit signal 154. When the translator arrangement 142 includes a small general purpose computer corresponding to the Hewlett-Packard Model 2114B noted in the Snyder U.S. Pat. No. 3,740,724, the translator includes interface circuits including an anticoincident circuit and counter circuits. The output drive lines from these counter interface circuits as described in this last-named Snyder patent include a predetermined number of data bit positions for input to the input/output (I/O) section of the above-identified computer. These drive line inputs include a predetermined number of bit positions for providing the binary count of data pulses occurring in the data track between consecutive interval pulses. In accordance with this invention, an additional data bit position is provided at the driver line outputs of the interface circuits to signal the translator computer of the outage condition in response to the recorded outage pulse 140.

To implement translator processing of the outage indicating signal 154 in the interface circuits disclosed in the aforementioned Snyder patent, an additional latch circuit, counter select gate (for each of the plural data channel counters) and a driver gate will be added. The output of the translator arrangement 142 is typically placed on a computer tape for subsequent processing by a commercial billing computer operation, and an extra character slot is added to the four slots provided for recording on the computer tape the count of the data tracks or tracks of the field recording tape 42. The programmable translator arrangement 142 is appropriately conditioned to receive the outage indicating signal 154.

The outage indicating circuit 152 is included in the aforementioned translator interface circuits. An input line 155 is connected thereto from the interval pulse shaper 148. An outage reset line 156 is applied as an input to the circuit 152 from the translator arrangement 142 to reset the circuit 152 after receipt of the outage indicating signal 154 on the line 153 to the translator arrangement 142.

The outage indicating circuit 152 is operated as the tape 42 is read and interval pulses are sensed by the interval pickup head 146. It is to be noted that the recorded outage pulse 140 will be sensed first or prior to when the interval pulse 112-2 shown in FIG. 2 is sensed in the translator. The circuit operation blocks the interval channel 151 to the translator arrangement 142 corresponding to the data input designated by the numeral 58 in U.S. Pat. No. 3,740,724. The blocking period is for a predetermined time immediately after a recorded pulse is read by the interval pickup head 146. A two input NAND gate 158 has one input connected to the input line 155 from the time interval pickup head 146. The other and enabling input to the gate 158, as described below, is normally in the enabled or one state. The output of the gate 158 is applied through an inverter 160 to invert the logic state output of gate 158 for applying it to the interval channel 151 and to the interface circuits of the translator arrangement 142 as described in the aforementioned U.S. Pat. No. 3,740,724.

The output of gate 160 is also applied to a monastable multivibrator circuit 162. The monostable multivibrator 162 has a monostable period equal to 0.05T of a time period T where T is the normal time between interval pulses occurring at the interval pickup head 146. Thus, the time period T is established by the spacing of the interval pulses on the tape 42 and the speed of the tape in the playback deck 143. The tape play back speed is 30 inches per second. The end of the period of the monostable 162 starts the "window" which is provided to look for a second pulse immediately following a first pulse in the time track. The output of the monostable circuit 162 goes from 0 state to the 1 state for the .05T time and is applied to the input of a second monostable multivibrator circuit 164 which has Q and Q outputs. A 1 state is normally at the Q output and a 0 state is normally at the Q output. These outputs reverse their logic states for the monostable period of 0.20T which is the period that the "window" is open so as to block the interval channel 151 to the immediately following second pulse in the interval track. The Q output is connected by line 165 to the enabling input of the gate 158 and goes from the 1 to the 0 logic state for 0.20T to inhibit the gate 158 and prevent any pulse from going on through to the normal interval input channel 151 of the translator arrangement 142.

The Q output of the monostable 164 is connected by line 165A to the enabling input of a NAND gate 166. The 0 to 1 transition from 0.20T time period enables the gate 166 so that a pulse from the line 155A can pass to trigger the output of the gate 166 from the interval pickup head 146. A set-reset flip-flop circuit 168 receives the output from the gate 166 at the set input thereof. The reset input to the flip-flop 168 is connected to the reset line 156 from the translator arrangement 142. A Q output of the flip-flop 168 provides the translator outage indicating signal 154 on the line 153 to the translator arrangement 142 when in the reset state and a pulse from line 155 is gated through the gate 166. Thus, the readouts from the translator interface circuits to the translator small computer will include binary count of the data signals which is initiated by the recorded outage pulse 140 occurring at the interval pickup head 146. Normally, this readout is initiated by each interval pulse, as noted in the aforementioned translator patents of the assignee of this invention. Further, a binary signal 154 having a predetermined position corresponding to the interval pulse slot will be read concurrently to the small computer inputs along with the data pulse count. The blocking operation of the circuit 152 commences at the short 0.05T time read-in period after a pulse in the time track occurs and ends at a 0.20T time read-in period thereafter to allow variation of a 5 percent time duration on either side of the approximate 10 percent interval spacing of a recorded interval pulse relative to a recorded outage pulse.

Figure 4:
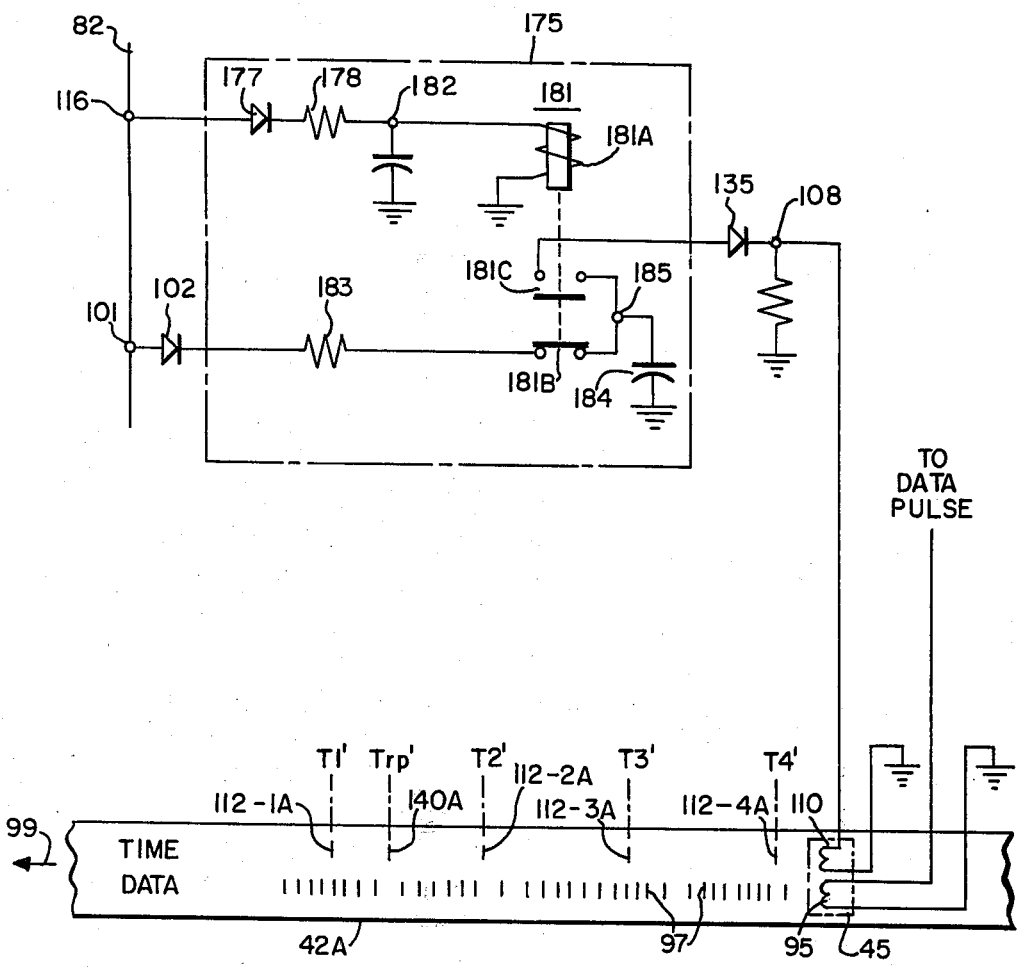
FIG. 4 is a fragmentary electric circuit diagram for replacing a portion of the circuit diagram illustrated in FIG. 2.

In FIG. 4, there is illustrated a fragmentary electrical circuit diagram of the recorder circuit shown in FIG. 2 including an alternative recorder outage indicating circuit 175 included with the broken line block which is to replace the circuit in the broken line block 115 in FIG. 2. The circuit 175 does not include the microswitch 75 and it would be omitted from the recorder mechanism shown in FIG. 1. The circuit 175 provides a recorded return-to-bias outage pulse 140A in a recording tape 42A at a time Trp' when the power returns from a power outage condition rather than at a predetermined position relative to an interval pulse.

A diode 177 is connected in series with the junction 116 of the conductor 82. A time delay circuit includes the resistor 178 and capacitor 179 with one resistor end connected to the diode 177 and the other end of the capacitor 179 which has its remaining end connected to the circuit ground. A relay switching device 181 providing an outage detecting device includes a coil 181A connected in series with a junction 182 common to the resistor 178 and capacitor 179 and the circuit ground. The relay switch contacts 181B and 181C are controlled by the coil 181A and are shown in FIG. 4 in the conducting and non-conducting conditions occurring when the coil 181A is deenergized. A resistor 183 is connected in series with the diode 102 and to the junction 101 of the supply conductor 82 and also to the contacts 181B and 181C. A capacitor 184 is connected between a common junction 185 of the contacts 181B and 181C and the circuit ground. The contact 181C is further connected through the diode 135 to the junction 108 and the time recording head coil 110.

In operation of the circuit 175, a tape 42A is recorded with the data pulses 97A and time interval pulses 112-1A, 112-2A, 112-3A and 112-4A at times T1',T2', T3' and T4' corresponding to the recorded data and time interval pulses in the tape 42 shown in FIG. 2 and described hereinabove. The relay coil 181A is initially energized at the beginning of the recording period so that the contacts 181C are closed and the contacts 181B are opened. This isolates the capacitor 184 from the supply conductor 82. At a time after the time T1' when the interval pulse 112-1A is recorded, a power outage occurs as described in the operation of FIG. 2 and ends at the time Trp'. A charge on the capacitor 179 holds the relay coil 181A energized for a predetermined time delay in the order of 4 to 8 seconds after the power is removed from the recorder circuits and the movement of the tape 42A stops. Upon the return to power at the time Trp', the coil 181A is not energized immediately due to the circuit delay action of the resistor 178 and capacitor 179. During this delay the contacts 181B remain closed so as to charge the capacitor 184 since the conductor 82 is again energized. After the time delay, the coil 181A is energized to open contacts 181B and close contacts 181C and discharge the capacitor 184 through the record head coil 110. This produces the outage pulse 140A at a short instant after the return to power time Trp' at the end of the power outage condition. Accordingly, the outage pulse 140A is recorded between the interval pulses 112-1A and 112-2A occurring at times T1' and T2' rather than after the interval pulse 112-2A and after the interval in which the outage occurred as provided in the recorder outage indicating circuit 115 illustrated in FIG. 2.

A translator system is provided in accordance with the system 141 in FIG. 3 to receive an outage indicating signal in response to the recorded outage pulse 140A when the tape 42A is translated. However, the outage apparatus disclosed in FIGS. 1, 2 and 3 are preferable since the outage indicating information is recorded and translated with respect to a predetermined position relative to the recorded time interval pulses.

While the invention described hereinabove is in accordance with the preferred embodiments disclosed, other alternative embodiments may be made with departing from the spirit and scope of our invention.

We claim:

1. A data recorder for recording metering information of a measured quantity subject to an interruption during an outage condition, comprising:
   a data input for receiving pulses responsive to predetermined amounts of a measured quantity;
   a time impulse control means actuated at regular time intervals;
   a switching control means having one conductive condition in response to presence of said measured quantity and an opposite conductive condition in response to the absence of said measured quantity;
   a data recording circuit means connected to said data input to generate data recording pulses;
   a time recording circuit means including said time impulse control means to generate time interval recording pulses in response to each actuation of said time impulse control means;
   an outage indicating circuit means including said switching control means, said outage indicating circuit means being connected to said time recording circuit means to generate a separate outage recording pulse in said time recording circuit in response to said switching control means being operated between said one and said opposite conductive conditions such that said outage recording pulse is produced in a predetermined relationship with respect to a time interval pulse generated immediately after an outage condition in said measured quantity.

2. The data recorder as claimed in claim 1 including an outage impulse control means connected in said outage indicating circuit means, said outage impulse control means being actuated at the same regular time intervals as said time impulse control means with a predetermined time period occurring between the times that said time impulse control means and said outage impulse control means are actuated, said outage impulse control means being effective to initiate said outage recording pulse only upon said switching control means being operated between said one and said opposite conductive conditions.

3. The data recorder as claimed in claim 2 including a magnetic tape recording medium; a first magnetic recording means connected in said data recording circuit for producing recorded data pulses in one track of said recording medium; a second magnetic recording means connected to said time recording circuit means for producing recorded time interval pulses and outage pulses in a second track of said recording medium.

4. The data recorder as claimed in claim 3 including a timing mechanism having a timing motor and a cam rotated by said motor with said time impulse control means and said outage impulse control means both being actuated at different predetermined rotated positions of said cam.

5. The data recorder as claimed in claim 4 wherein said pulses received at said data input are responsive to predetermined amounts of electric power being measured by a watthour metering device initiating said data pulses, and wherein said switching control is energized and deenergized indirectly by the electric power being measured to establish operation between said first and second conductive states in response to an outage condition.

6. The data recorder as claimed in claim 5 wherein said time impulse control means includes a first switch operated by a cam follower engaging said cam for actuation at said regular time intervals, and wherein said outage impulse control means includes a second switch operated by a switch actuating means disposed arcuately from said cam follower and engaging said cam such that said second switch is actuated at a predetermined short time period from the time that said first switch is actuated.

7. The data recorder as claimed in claim 6 wherein the actuating means of said second switch is displaced arcuately from the cam follower means of said first switch in the direction of rotation of said cam such that the second switch is actuated at said predetermined short time period following the instant that said first switch is actuated during each rotation of said cam.

8. The data recorder as claimed in claim 6 including a first capacitor means connected in said time recording circuit means and further including a second capacitor connected in said outage indicating circuit means such that said first capacitor is discharged through said second magnetic recording means when said first switch is actuated and said second capacitor is discharged through said second recording means upon said second switch being actuated following said outage condition.

* * * * *

Notice of Adverse Decision in Interference

In Interference No. 100,497, involving Patent No. 3,921,207, W. P. Doby and A. H. Maxwell, Jr., OUTAGE INDICATING APPARATUS FOR METER TELEMETRY SYSTEMS INCLUDING DATA RECORDERS, final judgment adverse to the patentees was rendered Apr. 29, 1983, as to claim 1.
*[Official Gazette November 8, 1983.]*